United States Patent
Shikata et al.

(10) Patent No.: US 7,093,152 B2
(45) Date of Patent: Aug. 15, 2006

(54) SEMICONDUCTOR DEVICE WITH A HARDWARE MECHANISM FOR PROPER CLOCK CONTROL

(75) Inventors: Takashi Shikata, Kawasaki (JP); Taizoh Satoh, Kawasaki (JP); Yoshihiro Hiji, Kawasaki (JP); Takuya Hirata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 493 days.

(21) Appl. No.: 10/079,903

(22) Filed: Feb. 22, 2002

(65) Prior Publication Data
US 2003/0037274 A1    Feb. 20, 2003

(30) Foreign Application Priority Data
Aug. 15, 2001   (JP)   ............................. 2001-246654

(51) Int. Cl.
G06F 1/06   (2006.01)
(52) U.S. Cl. ...................... 713/501; 710/107
(58) Field of Classification Search ................ None
See application file for complete search history.

(56) References Cited

U.S. PATENT DOCUMENTS

| | | | |
|---|---|---|---|
| 5,471,625 A | 11/1995 | Mussemann et al. | |
| 5,517,650 A | 5/1996 | Bland et al. | |
| 5,600,839 A | 2/1997 | MacDonald | |
| 5,628,019 A | 5/1997 | O'Brien | |
| 5,655,124 A | 8/1997 | Lin | |
| 6,088,806 A * | 7/2000 | Chee | 713/322 |
| 6,163,848 A | 12/2000 | Gephardt et al. | |
| 6,678,281 B1 * | 1/2004 | Chakrabarti et al. | 370/438 |
| 6,735,653 B1 * | 5/2004 | O Mathuna et al. | 710/105 |
| 6,748,546 B1 * | 6/2004 | Mirov et al. | 713/320 |
| 6,754,826 B1 * | 6/2004 | Challener et al. | 713/182 |

FOREIGN PATENT DOCUMENTS

| | | |
|---|---|---|
| EP | 0 644 475 A2 | 3/1995 |
| JP | 6-83616 | 3/1994 |
| JP | 7-152449 | 6/1995 |

* cited by examiner

Primary Examiner—Lynne H. Browne
Assistant Examiner—Anand B. Patel
(74) Attorney, Agent, or Firm—Staas & Halsey LLP

(57) ABSTRACT

A semiconductor device includes a clock generation unit which generates a clock signal, a first module which asserts a clock-control request signal, and one or more second modules, each of which receives the clock signal and the clock-control request signal, and asserts a clock-control acknowledge signal after stopping an operation thereof upon completion of a currently performed operation in response to the assertion of the clock-control request signal, wherein the clock generation unit selectively changes the clock signal supplied to the one or more second modules in response to assertion of all clock-control acknowledge signals output from the one or more second modules.

9 Claims, 7 Drawing Sheets

SEMICONDUCTOR DEVICE WITH A HARDWARE MECHANISM FOR PROPER CLOCK CONTROL

BACKGROUND OF THE INVENTION

1. Field of the Invention

The present invention generally relates to semiconductor devices operating in synchronization with a clock signal, and particularly relates to a semiconductor device in which electric power consumption can be reduced by controlling a clock signal.

2. Description of the Related Art

In semiconductor devices such as processors, the frequency of a clock signal is lowered or suspended for the purpose of reducing power consumption during a period in which high-speed processing is not required. Namely, the frequency of a clock signal is switched in a step-like manner as necessary (hereinafter called a "clock gear"), or the supply of the clock signal is suspended with respect to module blocks that do not need to be operating (hereinafter called a "power-down mode").

The clock gear is generally implemented by supplying a synchronizing signal for mask purposes that corresponds to the fastest clock signal used in the processor and by reducing the number of clock pulses by use of a gated clock buffer. Alternatively, the clock gear is implemented by dividing the frequency of a clock signal by a frequency divider. The power-down mode is generally implemented by masking the supply of a clock signal to all or part of the modules in the processor during a period in which their operations are not necessary. Such clock control is generally attended to by a clock control unit of the processor operating based on settings provided to chip terminal pins and software control provided by programs.

When a shift of the clock gear or a shift to the power-down mode is to be made in a configuration having an on-chip bus or an internal peripheral bus provided via a bus bridge inside the processor, a predetermined procedure must be performed based on software control. Namely, when a shift of the clock gear or a shift to the power-down mode is to be made, software-based operations need to be performed as preparation for such a shift in compliance with the predetermined protocols (operation specifications) relating to bus transfer and the like.

If the clock gear is changed during data transfer trough a bus (especially, during an instruction fetch) without performing such a required procedure, there is a risk of causing the processor to suffer a hang-up state due to the failure to fetch an instruction. Further, when a store instruction is carried out as a released operation handed over to a module that is connected to an internal peripheral bus via a bus bridge, for example, a write operation continues to be performed on the internal peripheral bus even after transfer on the on-chip bus is completed. If the clock gear is shifted without waiting for the store operation to be completed, there is a risk that the storing of data is not properly carried out. Further, when an SDRAM (synchronous dynamic random memory) controller is provided on a chip, for example, data of the SDRAM will be destroyed if the clock of the SDRAM controller is suspended without making the SDRAM shift into a self-refresh mode.

In order to avoid the problems as described above, a software program for performing a predetermined procedure necessary for a clock-gear shift or a transition to the power-down mode must be created in advance. If this predetermined procedure is not perfect up to minute details, however, an unpredictable hang-up or the like may occur.

Especially when a clock control program needs to be created for processors having an on-chip bus, a bus bridge, a chip-external bus (i.e., a bus that is connected to an SDRAM, SRAM, ROM, companion chip, or the like) operating based on complicated transfer protocols, the control procedure needs to take into account various conditions. It is thus difficult to eliminate all the risks of causing a hang-up state or data transfer errors through human errors.

Accordingly, there is a need for a semiconductor device that is provided with a hardware mechanism for eliminating the risk of causing a hang-up state at the time of a clock-gear shift or a transition to the power-down mode.

SUMMARY OF THE INVENTION

It is a general object of the present invention to provide a semiconductor device that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a semiconductor device particularly pointed out in the specification in such full, clear, concise, and exact terms as to enable a person having ordinary skill in the art to practice the invention.

To achieve these and other advantages and in accordance with the purpose of the invention, as embodied and broadly described herein, a semiconductor device according to the present invention includes a clock generation unit which generates a clock signal, a first module which asserts a clock-control request signal, and one or more second modules, each of which receives the clock signal and the clock-control request signal, and asserts a clock-control acknowledge signal after stopping an operation thereof upon completion of a currently performed operation in response to the assertion of the clock-control request signal, wherein the clock generation unit selectively changes the clock signal supplied to the one or more second modules in response to assertion of all clock-control acknowledge signals output from the one or more second modules.

In the semiconductor device as described above, when making a clock-gear shift or a transition to the power-down mode, the hardware control according to the present invention insures that clock control is carried out only after eliminating all the risks of having malfunctions by suspending all the modules having the risks of irregular operations caused by such clock control.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
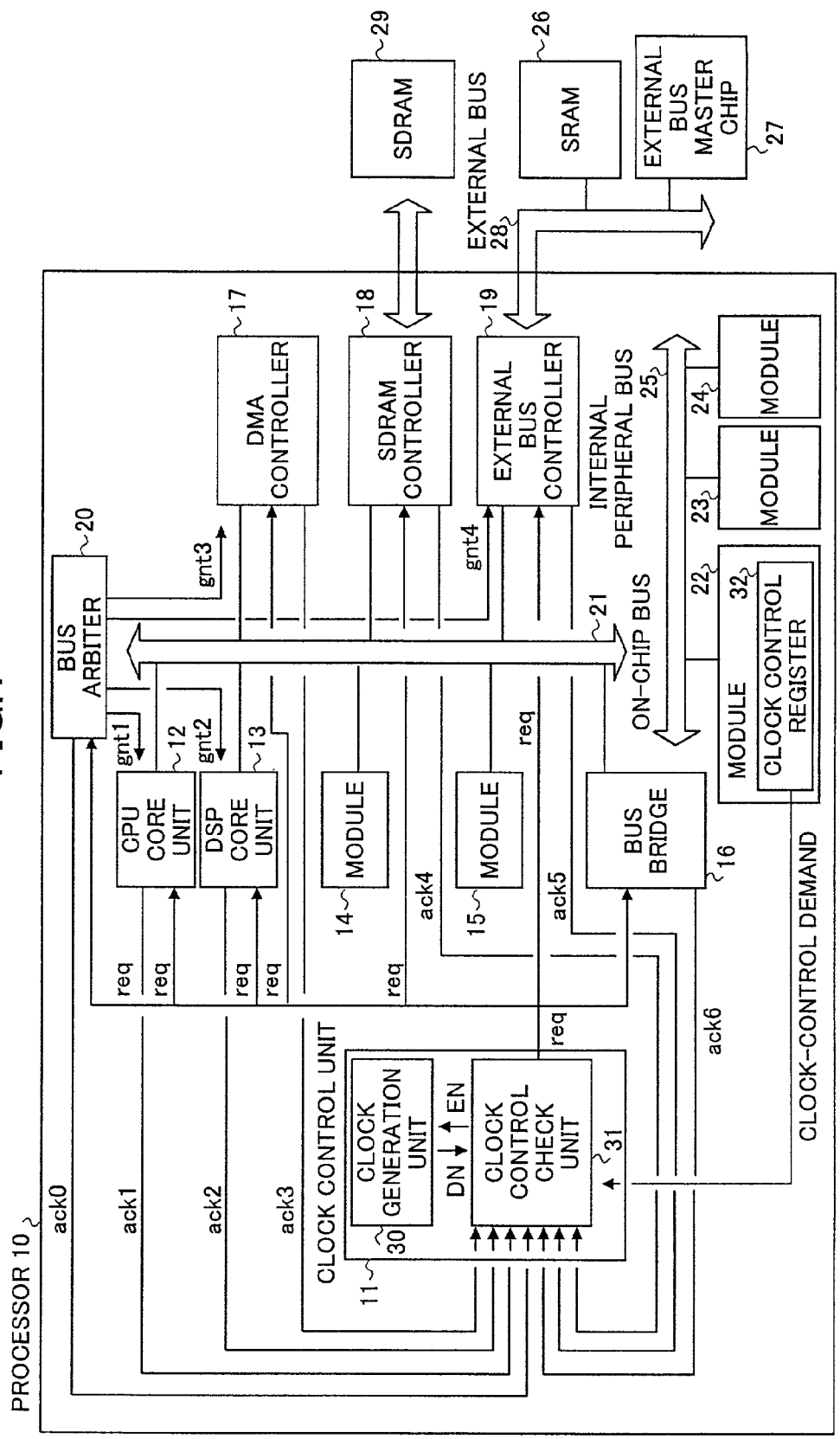
FIG. 1 is a block diagram of a processor according to a first embodiment of the present invention.

FIG. 1 is a block diagram of a processor according to the first embodiment of the present invention.

A processor 10 of FIG. 1 includes a clock control unit 11, a CPU core unit 12, a DSP core unit 13, a module 14, a module 15, a bus bridge 16 connecting between an on-chip bus (OCB) and a built-in peripheral bus (PB), a DMA controller 17, an SDRAM controller 18, an external bus controller 19, a bus arbiter 20 for the on-chip bus, the on-chip bus (OCB) 21, modules 22 through 24, the internal peripheral bus (PB) 25, an SRAM 26 and an external bus master chip 27 provided outside the processor 10 and connected to the external bus controller 19, an external bus 28, and an SDRAM 29 provided outside the processor 10 and connected to the SDRAM controller 18. The CPU core unit 12, the DSP core unit 13, the module 14, the module 15, the DMA controller 17, the SDRAM controller 18, and the external bus controller 19 are on-chip bus modules connected to the on-chip bus 21. The modules 22 through 24 are peripheral-bus modules connected to the internal peripheral bus 25. Moreover, the SRAM 26 and the external bus master chip 27 are external-bus modules connected to the external bus 28.

The clock control unit 11 includes a clock generation unit 30 and a clock control check unit 31. The module 22 includes a clock control register 32.

In the following, operations of the processor 10 according to the present invention will be described.

Consideration is given to an example situation in which clock control (a gear shift or a transition to the power-down mode) is made while the processor 10 is executing software for a particular application. In order to have the clock control started, a store (write) instruction is issued so as to store clock-control request data in the clock control register 32 of the module 22 connected to the internal peripheral bus 25. In detail, the write data of this store instruction is provided from the CPU core unit 12, and is transferred to the bus bridge 16 according to the transfer protocols of the on-chip bus 21. Further, the bus bridge 16 transmits a write request regarding the write data to the module 22, resulting in the write data being stored in the clock control register 32 of the module 22.

During the execution of a write operation sequence described above, the CPU core unit 12 executes subsequent instructions successively on a pipeline basis after issuing the store instruction for storing the clock-control request data.

When the clock-control request data is stored in the clock control register 32, the clock control register 32 sends a clock-control demand signal to the clock control unit 11. The clock-control demand signal is received by the clock control check unit 31 of the clock control unit 11. Having found that the clock-control demand signal is asserted, the clock control check unit 31 asserts a clock-control request signal req to each module that is subjected to clock control.

The clock-control request signal req is maintained in an asserting state until a clock-control-completion notifying signal DN is asserted.

In response to the clock-control request signal req, each module suspends an operation thereof after completing the operation that is currently being performed, and, then, asserts a clock-control acknowledge signal ackx (x=0, 1, 2, . . . , 6). Modules that receive the clock-control request signal req and assert the clock-control acknowledge signal includes the bus arbiter 20, the CPU core unit 12, the DSP core unit 13, the DMA controller 17, the SDRAM controller 18, the external bus controller 19, and the bus bridge 16. The bus arbiter 20 arbitrates the bus right (i.e., the right to use the bus) between the modules connected to the on-chip bus 21, and permits access to the bus by granting the bus right to a selected module. The bus bridge 16 performs data transfer between the on-chip bus 21 and the internal peripheral bus 25.

Upon receiving the clock-control request signal req, the bus arbiter 20, for example, negates bus grant signals gntx (x=1, 2, 3, 4) directed to all the bus masters (the CPU core unit 12, the DSP core unit 13, the DMA controller 17, and the external bus controller 19 in this example) after the currently performed transaction for data transfer comes to an end. Namely, by denying each master module the bus right, the bus arbiter 20 prohibits each master module from engaging in further data transfer. Thereafter, the bus arbiter 20 asserts the clock-control acknowledge signal ack0.

The clock-control acknowledge signal ack0 is maintained in the asserted condition until the clock-control request signal req is negated.

When all the clock-control acknowledge signals ackx from all the clock-control-subjected modules are asserted, the clock control check unit 31 learns this fact, and asserts a clock-control enable signal EN against the clock generation unit 30. At this point of time, all the modules subjected to clock control are temporarily suspending an operation thereof.

Upon detecting the clock-control enable signal EN, the clock generation unit 30 carries out a clock-control operation such as a clock-gear shift or a transition to the power-down mode requested by a program. Details of the clock-control operation are specified in the contents of the clock-control request data stored in the clock control register 32. The clock generation unit 30 is a source of clock signals that are supplied to the relevant modules. According to the request made by the program, the clock generation unit 30 selectively controls clock signals supplied to respective modules, thereby changing the operation frequency and/or suspending the supply of a clock signal on a module-specific basis.

Further, the clock generation unit 30 asserts a clock-control-completion notifying signal DN when the clock control process comes to an end.

Having found that the clock-control-completion notifying signal DN is asserted, the clock control check unit 31 negates the clock-control request signal req. In response to the negation of the clock-control request signal req, each clock-control-subjected module negates the clock-control acknowledge signal ackx. Upon the negation of the clock-control acknowledge signals ackx, the clock-control enable signal EN is negated, followed by the clock-control-completion notifying signal DN being negated.

Figure 2:
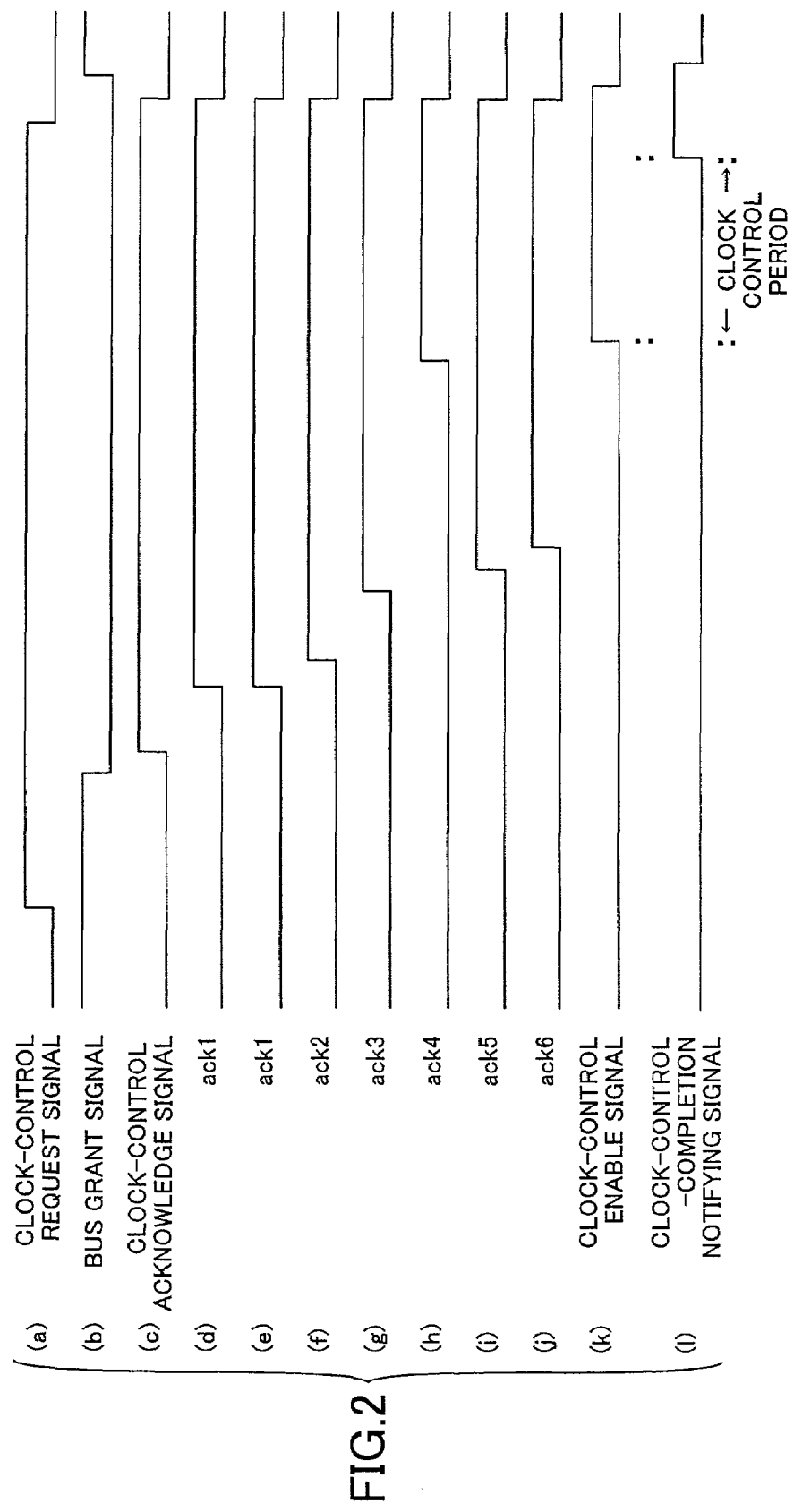
FIG. 2 is a timing chart showing signals of FIG. 1.

FIG. 2 is a timing chart showing signals described above.

As the clock-control request signal req is asserted as shown in FIG. 2-(a), the bus grant signal gntx is negated in response as shown in FIG. 2-(b). At different timings at which the currently performed operations come to an end at respective modules, the clock-control acknowledge signals ackx from the respective modules are changed to HIGH (in the asserted condition) as shown in FIGS. 2-(c) through (j).

When all the clock-control acknowledge signals ackx become HIGH, the clock-control enable signal EN turns to HIGH as shown in FIG. 2-(k), which initiates a clock-control operation such as a clock-gear shift or a clock suspension. After the completion of the clock-control operation, as shown in FIG. 2-(l), the clock-control-completion notifying signal DN is asserted.

Based on the hardware control as described above, when making a clock-gear shift or a transition to the power-down mode, the present invention insures that clock control is carried out only after eliminating all the risks of having malfunctions by suspending all the modules having the risks of irregular operations caused by such clock control.

Figure 3:
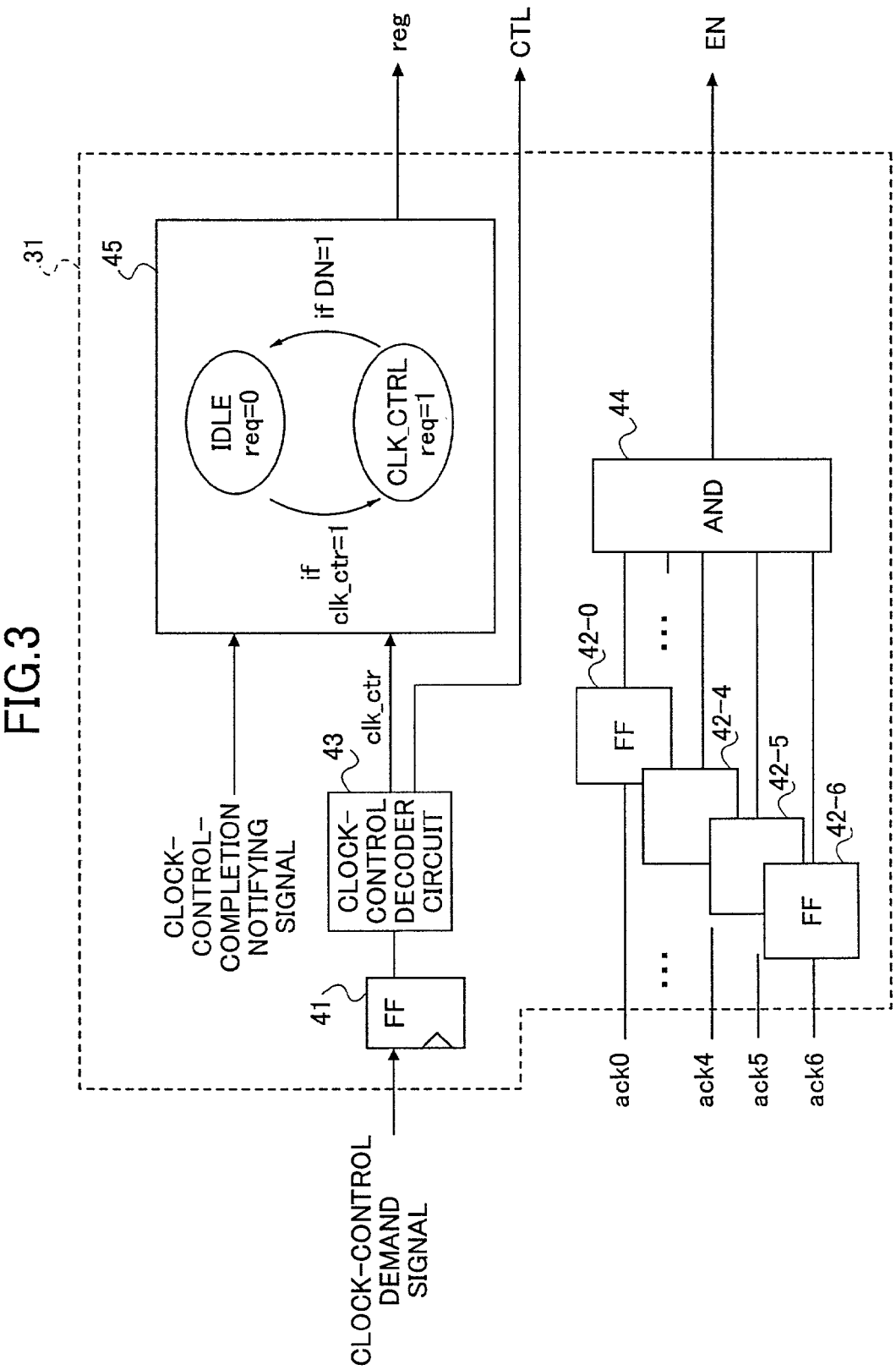
FIG. 3 is a block diagram showing an example configuration of a clock control check unit shown in FIG. 1.

FIG. 3 is a block diagram showing an example configuration of the clock control check unit 31.

The clock control check unit 31 of FIG. 3 includes a flip-flop 41, flip-flops 42-0 through 42-6, a clock-control decoder circuit 43, an AND circuit 44, and a request signal generation circuit 45. The flip-flop 41 latches the clock-control demand signal supplied from the clock control register 32. The latched clock-control demand signal is supplied to the clock-control decoder circuit 43, and is decoded thereby. The clock-control demand signal is comprised of a plurality of bits, and requests clock control. In addition, the clock-control demand signal specifies the details of control in a specific manner, for example, regarding whether the clock control is directed to a clock-gear shift or a clock suspension, which modules are subjected to the clock control, etc. The clock-control decoder circuit 43 decodes the clock-control demand signal, and generates control signals CTL for performing the specified clock control operations, followed by supplying the control signals CTL to the clock generation unit 30. Furthermore, the clock control decoder circuit 43 supplies a signal clk_ctr indicative of clock control to the request signal generation circuit 45.

The request signal generation circuit 45 is a simple state machine, and switches between an idle state IDLE and a clock-control state CLK_CTRL according to the incoming signal. When the signal clk_ctr indicative of clock control is asserted, the request signal generation circuit 45 shifts from the idle state IDLE to the clock-control state CLK_CTRL, and asserts the clock-control request signal req. Moreover, when the clock-control-completion notifying signal DN is asserted, the write-signal selector 45 switches from the clock-control state CLK_CTRL to the idle state IDLE, and negates the clock-control request signal req. A person having ordinary skill in the art would readily recognize that the request signal generation circuit 45 could be made by use of simple sequential logic circuits such as set-reset flip-flops.

Further, the clock control check unit 31 uses the flip-flops 42-0 through 42-6 to latch the clock-control acknowledge signals ackx (x=0, 1, 2, . . . , 6) supplied from the respective modules. The latched clock-control acknowledge signals ackx (x=0, 1, 2, . . . , 6) are supplied to the AND circuit 44. The AND circuit 44 performs an AND operation so as to assert the clock-control enable signal EN in response to the asserted statuses of all the clock-control acknowledge signals.

Figure 4:
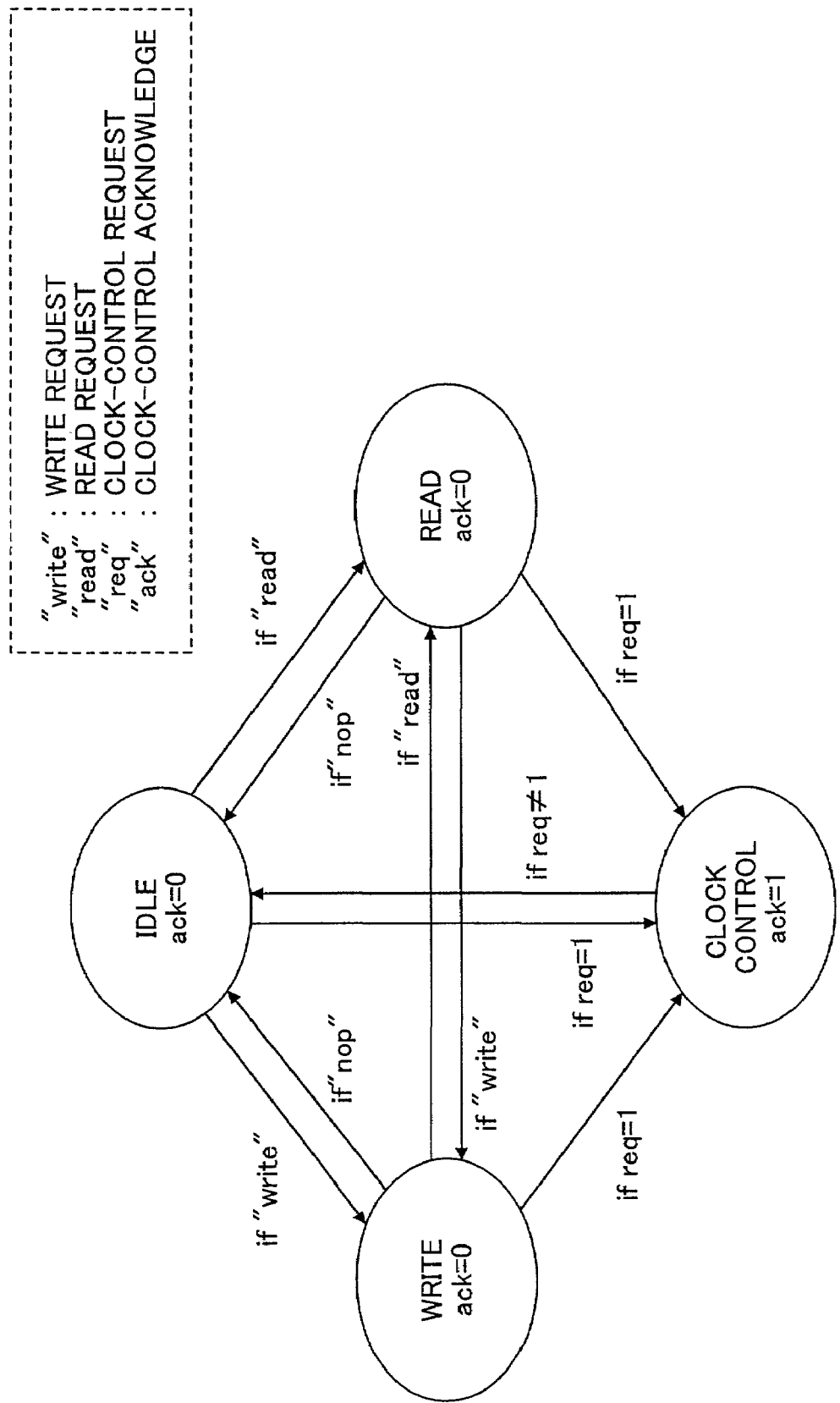
FIG. 4 is a drawing showing a clock-control mechanism used in a bus bridge that is subjected to clock control.

FIG. 4 is a drawing showing a clock-control mechanism used in the bus bridge 16 that is subjected to clock control.

The clock-control mechanism of FIG. 4 is a simple state machine that makes a state transition in response to an incoming signal, and has four transition states, which include a clock-control state, a write-in state WRITE, a read-out state READ, and an idle state IDLE. In the idle state IDLE, the bus bridge 16 waits for an operation instruction to come. When a write request or a read request arrives while it is in the idle state IDLE, the bus bridge 16 switches to the write-in state WRITE or to the read-out state READ according to the arrived request. In the write-in state WRITE, a process is performed that receives data from the on-chip bus 21 and writes the data in the module of the internal peripheral bus 25. In the read-out state READ, a process is performed that reads data from the module of the internal peripheral bus 25 and supplies the data to the on-chip bus 21.

When the a clock-control request signal req is asserted while one of the write-in state WRITE, the read-out state READ, and the idle-state IDLE is engaged, the bus bridge 16 will moves into the clock control state. Moving into the clock control state, the bus bridge 16 performs operations necessary as preparations for a clock-gear shift or a clock suspension, and asserts the clock-control acknowledge signal ack (ack6 in FIG. 1) when these operations are completed. Namely, the bus bridge 16 completes the currently performed operation, suspends processing, and asserts the clock-control acknowledge signal ack (ack6 in FIG. 1). When the clock-control request signal req is negated thereafter, the state is changed to the idle state IDLE. A person having ordinary skill in the art would easily recognize that the state machine performing operations as described above could be made by use of simple sequential logic circuits such as set-reset flip-flops.

Each of the modules that are subjected to clock control in FIG. 1 is provided with substantially the same state machine that is shown in FIG. 4, and is configured to assert the clock-control acknowledge signal ack after completing a preparatory operation for a clock shift or a clock suspension in response to the assertion of the clock-control request signal req.

Figure 5:
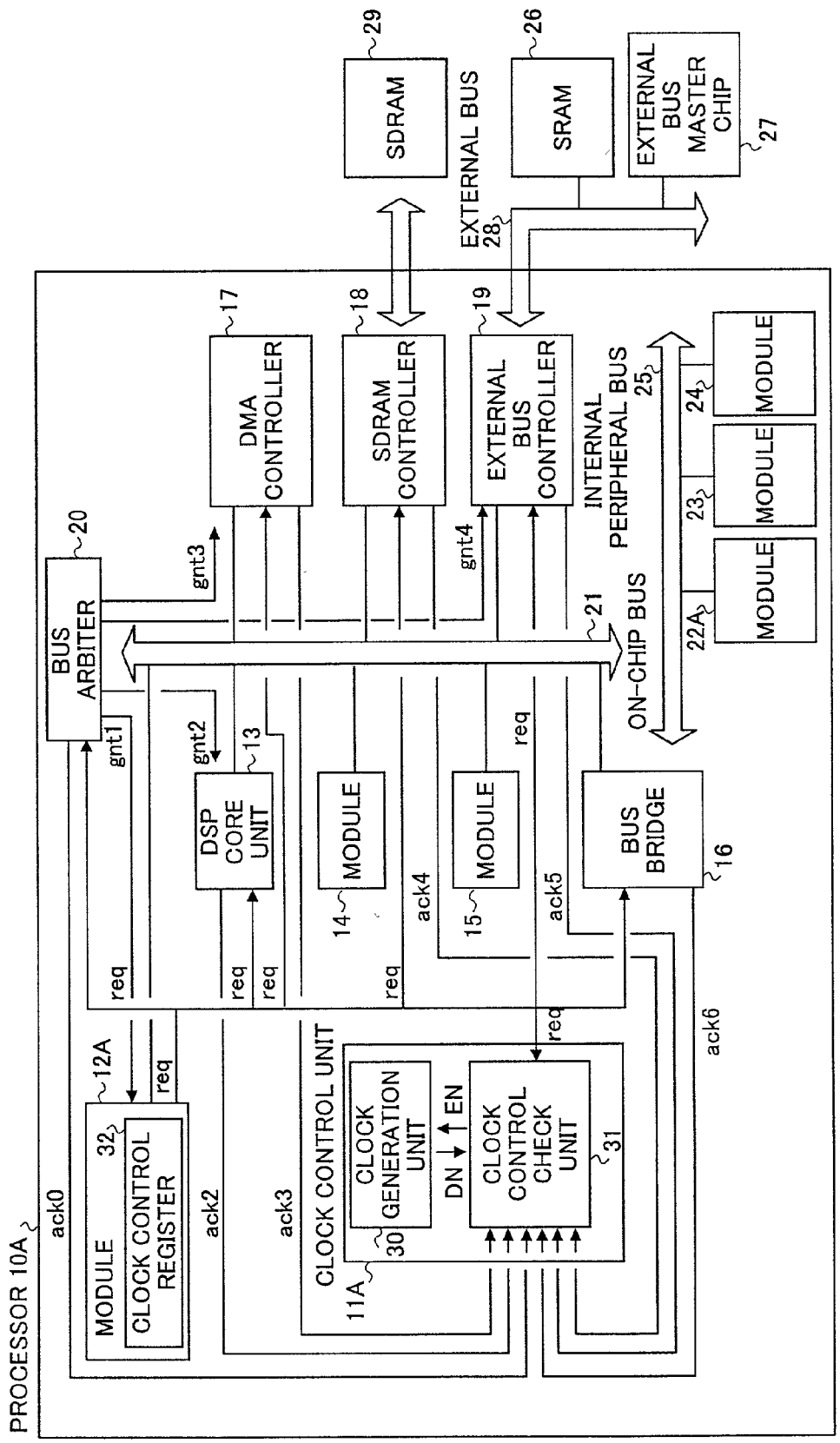
FIG. 5 is a block diagram of a processor according to a second embodiment of the present invention.

FIG. 5 is a block diagram of a processor according to the second embodiment of the present invention. In FIG. 5, the same elements as those of FIG. 1 are referred by the same numerals.

In a processor 10A shown in FIG. 5, a clock control unit 11A is provided in place of the clock control unit 11, and a CPU core unit 12A is provided instead of the CPU core unit 12. Further, a module 22A is provided in place of a module 22.

The second embodiment differs from the first embodiment in terms of its configuration and operation in that the clock control register 32 is situated in the CPU core unit 12A, and in that the CPU core unit 12A generates the clock-control request signal req, and supplies same to each unit. When an operation performed by program execution stores clock-control request data in the clock control register 32, the CPU core unit 12A asserts the clock-control request signal req. In response, relevant modules suspend operations thereof after currently performed operations come to an end, and change the clock-control acknowledge signals ackx to HIGH (asserted condition). After receiving the clock-control request signal req from the CPU core unit 12A, the clock control unit 11A changes the clock-control enable signal EN to HIGH when all the clock-control acknowledge signals ackx become HIGH. This initiates a clock-control operation such as a clock-gear shift or a clock suspension. After the completion of the clock-control operation, the clock-control-completion notifying signal DN is asserted.

As described above, the second embodiment is basically the same as the first embodiment, except that the CPU core unit 12A asserts the clock-control request signal req.

Figure 6:
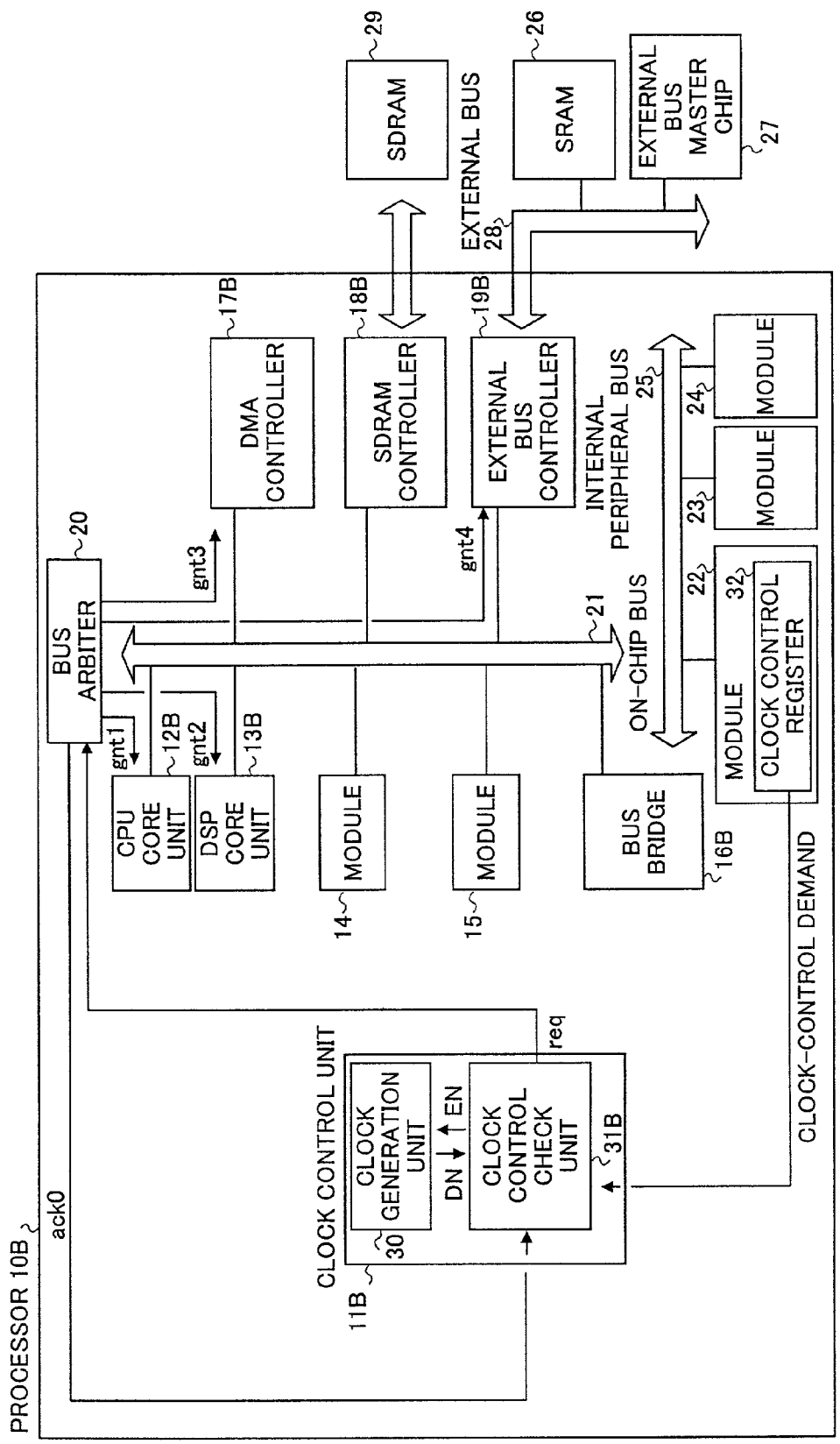
FIG. 6 is a block diagram of a processor according to a third embodiment of the present invention.

FIG. 6 is a block diagram of a processor according to a third embodiment of the present invention. In FIG. 6, the same elements as those of FIG. 1 are referred to by the same numerals.

In a processor 10B shown in FIG. 6, the clock-control request signal req asserted by a clock control check unit 31B of a clock control unit 11B is supplied only to the bus arbiter 20. Unlike the first embodiment, no clock-control request signal req is supplied to a CPU core unit 12B, a DSP core unit 13B, a bus bridge 16B, a DMA controller 17B, an SDRAM controller 18B, and an external bus controller 19B.

After receiving the clock-control request signal req, the bus arbiter 20 negates the bus grant signals gntx (x=1, 2, 3, 4) directed to all the bus masters (the CPU core unit 12B, the DSP core unit 13B, the DMA controller 17B, and the external bus controller 19B in this example) after the currently performed transaction for data transfer comes to an end. Namely, by denying each master module the bus right, the bus arbiter 20 prohibits each master module from engaging in further data transfer. Thereafter, the bus arbiter 20 asserts the clock-control acknowledge signal ack0.

In this manner, the clock-control request signal req is supplied to the bus arbiter 20, and, then, the bus arbiter 20 negates the bus grant signals gntx (x=1, 2, 3, 4) directed to respective bus masters. This prohibits each master module form obtaining the bus right, so that transaction processes through bus will no longer be performed.

The configuration of the third embodiment described above is particularly effective where transactions via the on-chip bus 21 are the only possible source of problems when clock control is carried out to make a clock-gear shift or a transition to the power-down mode. In such a case, the clock-control request signal req may be supplied exclusively to the bus arbiter 20 so as to suspend operations of the bus masters connected to the on-chip bus 21 through control of the bus grant signals, thereby suspending transactions through the on-chip bus 21 prior to the commencement of clock control.

As can be seen from the comparison of FIG. 1 with FIG. 6, the configuration of the third embodiment can reduce the circuit size by reducing the number of modules that are controlled by way of the clock-control request signal req.

Figure 7:
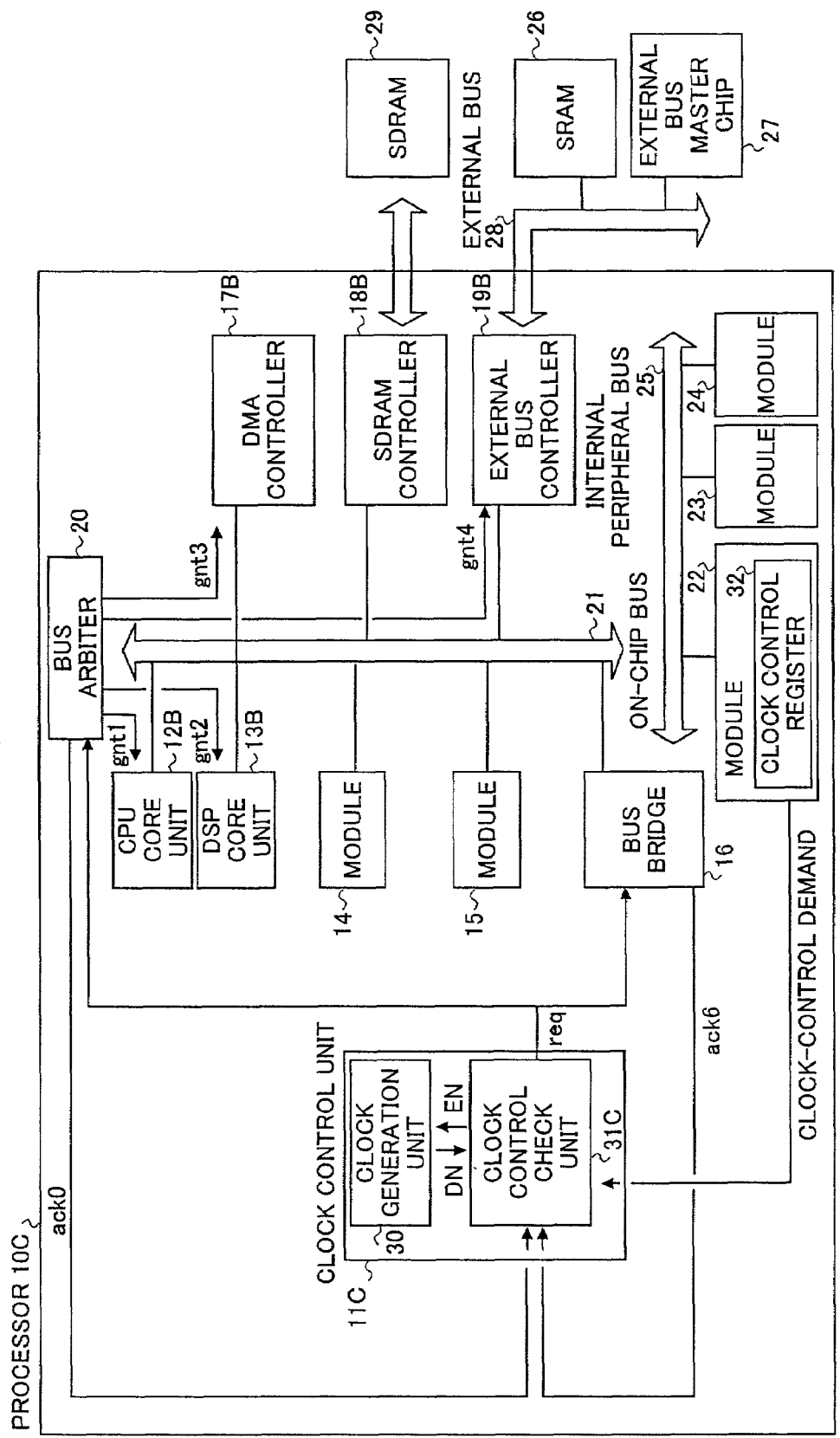
FIG. 7 is a block diagram showing a processor according to a fourth embodiment of the present invention.

FIG. 7 is a block diagram showing a processor according to the fourth embodiment of the present invention. In FIG. 7, the same elements as those of FIG. 6 are referred to by the same numerals.

In a processor 10C shown in FIG. 7, the clock-control request signal req asserted by a clock control check unit 31C of a clock control unit 11C is supplied only to the bus arbiter 20 and the bus bridge 16. As in the third embodiment, it is assumed that the modules connected to the on-chip bus 21, except for the bus bridge 16, do not cause problems if the bus arbiter 20 refuses to grant the bus right by use of bus-grant signals. Accordingly, the clock-control request signal req is not supplied to the CPU core unit 12B, the DSP core unit 13B, the DMA controller 17B, the SDRAM controller 18B, and the external bus controller 19B.

After receiving the clock-control request signal req, the bus bridge 16 stops writing data from the on-chip bus 21 to a module of the internal peripheral bus 25 or stops reading data from a module of the internal peripheral bus 25 to the on-chip bus 21 when a currently performed data transfer transaction is completed. Thereafter, the bus bridge 16 asserts the clock-control acknowledge signal ack6.

The configuration of the fourth embodiment described above is particularly effective where transactions on the on-chip bus 21 and data transfer via the bus bridge 16 are the only possible source of problems when clock control is carried out to make a clock-gear shift or a transition to the power-down mode. In such a case, the clock-control request signal req may be supplied exclusively to the bus arbiter 20 and the bus bridge 16 so as to suspend the operations of the bus masters connected to the on-chip bus 21 through control of the bus grant signals and to suspend the operation of the bus bridge 16, thereby suspending all the transactions possibly causing problems prior to the commencement of clock control.

As can be seen from the comparison of FIG. 1 with FIG. 7, the configuration of the fourth embodiment can reduce the circuit size by reducing the number of modules that are controlled by way of the clock-control request signal req.

Further, the present invention is not limited to these embodiments, but various variations and modifications may be made without departing from the scope of the present invention.

The present application is based on Japanese priority application No. 2001-246654 filed on Aug. 15, 2001, with the Japanese Patent Office, the entire contents of which are hereby incorporated by reference.

What is claimed is:

1. A semiconductor device, comprising:
a clock generation unit which generates a clock signal;
a first module which asserts a clock-control request signal;
one or a plurality of second modules, each of which receives the clock signal and the clock-control request signal, and asserts a clock-control acknowledge signal after stopping an operation thereof, upon completion of a currently performed operation, in response to the assertion of the clock-control request signal;
an on-chip bus;
a plurality of modules connected to said on-chip bus; and
a bus arbiter which arbitrates a bus right between bus masters that are some of said plurality of modules, wherein said bus arbiter is one of said one or said plurality of second modules, and asserts the clock-control acknowledge signal as a response to the assertion of the clock-control request signal from said first module after refusing to grant the bus right to any one of the bus masters upon completion of a currently performed transfer operation on said on-chip bus,
wherein said clock generation unit selectively changes the clock signal supplied to said one or said plurality of second modules in response to assertion of all the clock-control acknowledge signals output from said one or said plurality of second modules including said bus arbiter.

2. The semiconductor device as claimed in claim 1, wherein said clock generation unit selectively changes the clock signal by changing a frequency of the clock signal or stopping supply of the clock signal supplied to said one or plurality of second modules.

3. The semiconductor device as claimed in claim 1, wherein said first module is a CPU core circuit.

4. The semiconductor device as claimed in claim 1, wherein said first module asserts a clock-control enable signal to said clock generation unit in response to the assertion of all the clock-control acknowledge signals output from said one or plurality of second modules, and said clock generation unit selectively changes the clock signal in response to the assertion of the clock-control enable signal.

5. The semiconductor device as claimed in claim 1, wherein said one or plurality of second modules consists of said bus arbiter.

6. The semiconductor device as claimed in claim 1, further comprising:
   an internal peripheral bus; and
   a bus bridge which connects between said internal peripheral bus and said on-chip bus, wherein said bus bridge is one of said one or plurality of second modules, and asserts the clock-control acknowledge signal after refraining from performing a data transfer operation upon completion of a currently performed data transfer operation on said internal peripheral bus in response to the assertion of the clock-control request signal.

7. The semiconductor device as claimed in claim 6, wherein said one or plurality of second modules consists of said bus arbiter and said bus bridge.

8. A method of clock control for a semiconductor device, comprising:
   generating a clock signal;
   asserting a clock-control request signal to one or a plurality of modules, each of which receives said clock signal and said clock-control request signal and asserts a clock-control acknowledge signal after stopping operation upon completion of a currently performed operation;
   arbitrating a bus right between bus masters that are some of a plurality of modules connectable to an on-chip bus, on which a transfer operation is performable;
   asserting said clock-control acknowledge signal as a response to the assertion of the clock-control request signal after refusing to grant the bus right to any one of the bus masters upon completion of a currently performable transfer operation; and
   selectively changing the clock signal supplied to said one or said plurality of modules in response to the assertion of all said clock-control acknowledge signals output from said one or said plurality of modules.

9. An apparatus comprising:
   means for generating a clock signal;
   means for asserting a clock-control request signal to one or a plurality of modules, each of which receives said clock signal and said clock-control request signal and asserts a clock-control acknowledge signal after stopping operation upon completion of a currently performed operation;
   means for arbitrating a bus right between bus masters that are some of a plurality of modules connectable to an on-chip bus, on which a transfer operation is performable;
   means for asserting said clock-control acknowledge signal as a response to the assertion of the clock-control request signal after refusing to grant the bus right to any one of the bus masters upon completion of a currently performable transfer operation; and
   means for selectively changing the clock signal supplied to said one or said plurality of modules in response to the assertion of all said clock-control acknowledge signals output from said one or said plurality of modules including said means for arbitrating a bus right.

* * * * *